(12) United States Patent
Mardjono et al.

(10) Patent No.: US 11,047,303 B2
(45) Date of Patent: Jun. 29, 2021

(54) SUPPLY DUCT OF A COMPRESSOR OF A TURBINE ENGINE

(71) Applicant: Safran Aircraft Engines, Paris (FR)

(72) Inventors: Jacky Novi Mardjono, Moissy-Cramayel (FR); Norman Bruno André Jodet, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 153 days.

(21) Appl. No.: 16/042,195

(22) Filed: Jul. 23, 2018

(65) Prior Publication Data

US 2019/0024586 A1   Jan. 24, 2019

(30) Foreign Application Priority Data

Jul. 24, 2017 (FR) ..................................... 17 57018

(51) Int. Cl.
 *F02C 7/045* (2006.01)
 *F01D 1/02* (2006.01)
 (Continued)

(52) U.S. Cl.
 CPC ............... *F02C 7/045* (2013.01); *F01D 1/02* (2013.01); *F01D 9/06* (2013.01); *F04D 19/02* (2013.01);
 (Continued)

(58) Field of Classification Search
 CPC ........ F04D 29/40; F04D 29/54; F04D 29/545; F04D 29/547; F04D 19/05; F02C 7/045;
 (Continued)

(56) References Cited

U.S. PATENT DOCUMENTS

| 2,763,426 A | 9/1956 | Erwin |
| 2,912,156 A * | 11/1959 | Gentile ................. F04D 29/541 |
| | | 415/194 |

(Continued)

FOREIGN PATENT DOCUMENTS

| FR | 2 162 257 A1 | 7/1973 |
| WO | WO 02/36951 A1 | 5/2002 |

OTHER PUBLICATIONS

French Preliminary Report on Patentability and Written Opinion dated Mar. 19, 2018 in corresponding French Patent Application No. 1757018 (with English Translation of Category of Cited Documents), 7 pages.

*Primary Examiner* — Ehud Gartenberg
*Assistant Examiner* — Jacek Lisowski
(74) *Attorney, Agent, or Firm* — Oblon, McClelland, Maier & Neustadt, L.L.P.

(57) ABSTRACT

A supply duct of a compressor of a turbine engine, formed from internal and external walls of revolution around an axis and opposite one another to define a circulation stream of a fluid, is provided. The stream allows the fluid to be routed from the inlet of the duct to the inlet of the compressor. The radius of the external wall at the inlet of the duct is greater than the radius of the duct at the inlet of the compressor. The duct includes a portion for which the radius of the external wall along the portion is less than the radius of the external wall at the inlet of the compressor, and the radius of the internal wall along the portion of the duct is less than the radius of the internal wall at the inlet of the compressor.

8 Claims, 1 Drawing Sheet

(51) Int. Cl.
  *F01D 9/06* (2006.01)
  *F04D 29/54* (2006.01)
  *F04D 19/02* (2006.01)
  *F02K 3/06* (2006.01)

(52) U.S. Cl.
  CPC .............. *F04D 29/547* (2013.01); *F02K 3/06* (2013.01); *F05D 2250/323* (2013.01); *F05D 2250/324* (2013.01); *F05D 2250/51* (2013.01); *F05D 2260/60* (2013.01)

(58) Field of Classification Search
  CPC ..... F01D 1/02; F01D 9/06; F02K 3/06; F05D 2250/51; F05D 2260/60
  See application file for complete search history.

(56) References Cited

U.S. PATENT DOCUMENTS

| | | | |
|---|---|---|---|
| 3,338,049 A | | 8/1967 | Fernberger |
| 3,824,785 A | | 7/1974 | Soligny et al. |
| 10,598,022 B1 | * | 3/2020 | Kannangara .............. F02K 3/06 |
| 2016/0053767 A1 | * | 2/2016 | Morgan ................ F04D 29/403 |
| | | | 415/1 |
| 2017/0051669 A1 | * | 2/2017 | Chang ........................ F02C 7/05 |
| 2017/0174359 A1 | * | 6/2017 | Furukawa ................. F02C 7/00 |
| 2018/0283282 A1 | * | 10/2018 | Pointon .................... F02C 9/18 |
| 2019/0048826 A1 | * | 2/2019 | Pointon .................... F01D 1/02 |

\* cited by examiner

SUPPLY DUCT OF A COMPRESSOR OF A TURBINE ENGINE

FIELD OF THE INVENTION

The present invention relates to a fluid supply duct of a turbine engine, the structure of which allows a reduction in the noise generated by the operation of the turbine engine, and more particularly the noise generated by a compressor of said turbine engine.

PRIOR ART

The noise caused by the operation of turbine engines is a recurrent problem present for a number of years in the aeronautical industry, in particular as regards transport airplanes for which noise limits in takeoff and landing noise are generally imposed.

The noise generated by the operation of a turbine engine is due primarily to the turbines, to the compressors and to the fan.

As regards more particularly turbojets, the "double flow" technology has generated changes in the general structure of turbojets so as to allow separation of the inlet flow into a primary flow which passes through the entire jet engine while passing through a low-pressure (BP) compressor, through a high-pressure (HP) compressor, and through combustion chambers and the high pressure and low pressure turbines, and a secondary flow which bypasses the core, or hot portion of the jet engine. These structural changes have henceforth allowed a significant reduction in the noise of jet engines.

Moreover, other methods are currently implemented so as to further reduce sound levels. These methods generally consist of an appropriate aerodynamic study of the different stages of the turbojet, leading to an adjustment for example of the blade pitch, the spacing between the fixed and mobile stages, or even the number of blades of the different rotors and stators situated in the important locations of the turbojet.

These adjustments are often positive and contribute to reducing the noise of the turbojet. But it remains necessary to find other alternatives, which can in particular be implemented jointly with the preceding methods, so as to further reduce the operating noise of turbine engines.

DISCLOSURE OF THE INVENTION

The invention therefore has as its goal to correct the disadvantages of the prior art by proposing a supply duct of a compressor of a turbine engine the structure of which allows a reduction in the noise generated by the compressor.

Another goal of the invention is to propose a turbine engine comprising at least one compressor supplied by at least one such supply duct, of which the noise generated during operation is reduced with respect to existing turbine engines.

To this end, the invention relates to a supply duct of a compressor of a turbine engine, formed from an internal wall and an external wall of revolution around an axis and opposite one another so as to define a circulation stream of a fluid, said stream allowing the fluid to be routed from the inlet of the duct to the inlet of the compressor, the radius of the external wall of the duct at the inlet to the duct being greater than the radius of the duct at the inlet of the compressor, the duct being mainly characterized in that it comprises at least one portion for which the radius of the external wall of the duct along the portion is less than the radius of the external wall of the duct at the inlet of the compressor, and the radius of the internal wall of the duct along the portion of the duct is less than the radius of the internal wall of the duct at the inlet of the compressor.

According to other optional features of the supply duct according to the invention:

at least one radius $R_{ext}$ of the external wall of the duct along the portion of the duct satisfies:

$$R_{ext} = \alpha \cdot R_{ext,comp}, \text{ with } 0 < \alpha < 0.95 \quad (3)$$

the relation (2) is verified over the entire length of a part of the portion;

the duct has a length defined between an abscissa $x_{cond}$ representing the inlet of the duct and an abscissa $x_{comp}$ representing the inlet of the compressor so that the outer radius $R_{ext}$ of the external wall of the duct, the inner radius $R_{int}$ of the internal wall of the duct, said abscissa $x_{cond}$ representing the inlet of the duct and said abscissa) $x_{comp}$ representing the compressor inlet satisfy the following relation:

$$x_{Comp} - x_{Cond} > 0.8 \cdot (R_{Ext} - R_{int}) \quad (4)$$

Another object of the invention relates to a turbine engine comprising at least one compressor supplied by at least one supply duct as previously described.

The turbine engine is preferably a double flow turbojet.

Another object of the invention is a double flow turbojet comprising at least one compressor supplied by at least one supply duct as described previously, the supply duct of the compressor being a circulation duct of the primary flow.

Preferably, the supply duct of the compressor is a supply duct of a low-pressure compressor.

DESCRIPTION OF THE FIGURES

Other advantages and features of the invention will appear upon reading the following description given by way of an illustrative and non-limiting example, with reference to the appended figures which show.

DETAILED DESCRIPTION OF THE INVENTION

General

Figure 1:
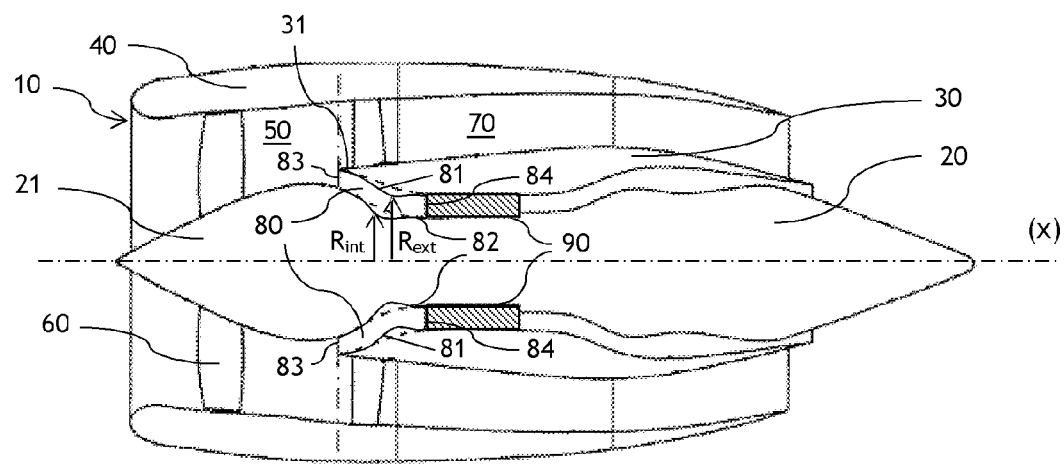
FIG. 1, a simplified section view of a turbojet comprising a compressor and a supply duct of the compressor situated upstream of said compressor.

The supply duct of a compressor according to the invention allows a reduction in the sound generated by a turbine engine, and in particular an aircraft engine, such as for example a turbojet or a turboprop.

The duct can more particularly, but not exclusively, be mounted in a turbojet of the "double flow" type, and thereupon allows a reduction in the noise generated by the circulation of the primary flow within the turbojet.

The proposed supply duct allows in particular a reduction in the noise generated by the compressor upstream of the turbine engine. This noise is primarily generated by the interaction of the fluid flow with the blades of the compressor and can be amplified, in particular if interaction phenomena occur with a fan situated upstream of the compressor. This noise can prove particularly annoying during low-thrust phases, such as an approach phase of an aircraft for example, when the fan noise becomes less significant.

Recall that acoustic propagation in a duct is a phenomenon for which the acoustic energy is distributed on a modal basis. Each mode corresponds to a quantity of energy, which his expressed in the form of acoustic waves which propagate, the mode is then called "passing", or which are not propagated, the mode is then called "cut off."

The characteristics of propagation in a duct of a given mode are defined by a parameter called the "cut-off ratio", denoted CR. Based on the dimensions of the installation, it allows a determination of whether the acoustic wave is expected to propagate or not in the duct. The cut-off ratio is defined by the following relation (1):

$$CR = \frac{2\pi f}{c * \sqrt{1 - M^2 * |m| * 10^{0.282 * |m| - 0.607/D_{ext}}}} \quad (1)$$

In which:
f represents the frequency of passage of a blade of the compressor,
c represents the speed of sound in the medium considered,
M represents the Mach number of the fluid flow considered, the fluid generally being air or likened to air,
m represents the number of the azimuthal mode considered,
$D_{ext}$ represents the diameter of the external wall of the circulation duct of the fluid.

In order for the mode considered to be cut off, it is necessary to have a cut-off ratio less than 1. It has been observed that minimizing the diameter $D_{ext}$ of the external wall of the circulation duct of the fluid was particularly advantageous for cutting off the mode considered, and concomitantly allowing a reduction of the noised caused by the circulation of a fluid in a duct.

Reducing the noise generated by the compressor is therefore attempted by optimizing the general shape of the duct situated upstream of the compressor.

From upstream to downstream of the duct with respect to the air flow direction in the duct, the walls of the supply duct of the compressor are convergent, then divergent with respect to the axis of revolution of the duct. This feature will be developed in more detail hereafter in the description, supporting FIGS. 1 and 2 which illustrate an example of the supply duct of a compressor within a turbine engine, according to the invention.

EXAMPLE

Figure 2:
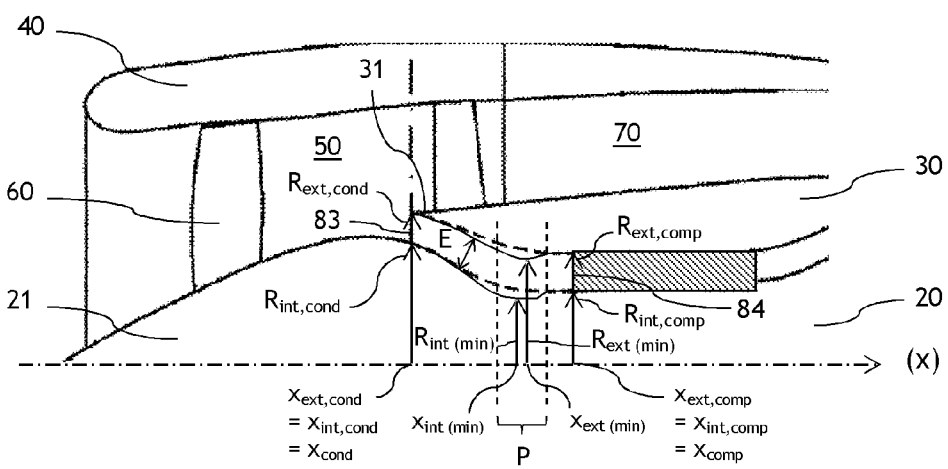
FIG. 2, an enlargement of the supply duct of the compressor shown in FIG. 1.

The turbine engine 10 shown in FIGS. 1 and 2 is a double flow turbojet.

It is specified for the following that the term "upstream" (AM) corresponds to a zone of provenance of the fluid which passes through the turbine engine 10 during operation and that the term "downstream" (AV) corresponds to a zone of departure of this fluid. Thus the fluid passes through the turbine engine, and in particular the supply duct of the compressor, from upstream to downstream.

The turbojet 10 comprises a body 20 with a longitudinal axis (x) oriented from upstream to downstream, the body 20 being housed in a casing 30, and the assembly of the body and the casing being mounted in a nacelle 40.

The upstream portion 21 of the body 20 of the turbojet forms an inlet cone of the total air flow which delimits, with the nacelle 40, an air inlet duct 50 into the turbojet.

A fan 60 provided with a plurality of blades extends upstream of the turbojet at the air inlet duct 50 and receives the total inlet air flow which penetrates into the turbojet.

The total air flow is then split between a secondary flow which circulates in the space 70 extending the air inlet duct 50 situated between the nacelle 40 and the body 20 of the turbojet, and a primary flow which circulates in the supply duct 80 of the compressor according to the invention to the compressor 90. This separation of the total air flow into a primary and secondary air flow downstream of the fan 60 is accomplished by a separation cone 31 which extends between the circulation space 70 of the secondary flow and the primary flow circulation duct 80.

In the embodiment illustrated in FIGS. 1 and 2, the compressor 90 is a low-pressure (BP) compressor, situated upstream of a high-pressure (HP) compressor, the latter not being shown. Other types of compressors or compressor sets can be provided instead of the low-pressure compressor thus illustrated.

In FIGS. 1 and 2, a supply duct corresponding to the prior art is shown in dotted lines, and an exemplary embodiment of the supply duct according to the invention is shown in solid lines, which allows the difference in structure to be observed, in particular the difference in curvature, between the duct of the invention and the duct of the prior art.

The supply duct 80 of the compressor is a body of revolution around its axis, congruent with the axis (x) of the turbojet. It is formed of an external wall 81, with radius $R_{ext}$ measured from the axis (x), and an internal wall 82, with radius $R_{int}$ also measured from the axis (x).

The internal 82 and external 81 walls of the supply duct are opposite one another, so that they define a fluid circulation stream, of the primary flow in this case, allowing the fluid to be routed from the inlet 83 of the duct to the outlet 84 of the duct corresponding to the inlet of the compressor 90.

In the exemplary embodiment of the turbojet of FIGS. 1 and 2, the supply duct 80 extends from the downstream end of the air inlet duct, downstream of the fan 60, to the inlet of the compressor 90 by which the fluid penetrates into the interior of the compressor. The inlet 83 of the duct (its upstream end) corresponds substantially to the upstream end of the separation cone 31.

It will be understood, however, that the emplacement of the inlet 83 of the supply duct can vary from one turbine engine to another depending on the design of said turbine engine, and that it generally consists of a transition zone marking the passage of the fluid from a first element toward a second element of the turbine engine, the second element being a compressor or a compressor set.

The compressor 90 is advantageously positioned in the immediate continuation of the duct 80 so as to avoid losses of air in the body of the turbojet. The inlet 84 of the compressor corresponds in particular to the leading edge of the first movable wheel of the compressor 90.

As illustrated in FIGS. 1 and 2, the radius $R_{ext,cond}$ of the external wall 81 of the duct at the inlet 83 of the duct is greater than the radius $R_{ext,comp}$ of the external wall 81 of the duct at the inlet 84 of the compressor.

Similarly, the radius $R_{int,cond}$ of the internal wall 82 at the inlet 83 of the duct is greater than the radius $R_{int,comp}$ of the internal wall 82 at the inlet 84 of the compressor.

This is manifested by the fact that the inlet 83 of the duct is farther from the axis (x) than the inlet 84 of the compressor.

Moreover, the supply duct 80 according to the invention comprises at least a portion P of the duct for which the radius $R_{ext}$ of the external wall 81 of the duct is less than the radius $R_{ext,comp}$ of the external wall 81 of the duct at the inlet 84 of the compressor. It is specified that the terms "along the portion" signify on the entire portion, that is at every point of said portion.

The portion P of the duct has a given length, necessarily less than the length of the duct.

Along the portion P of the duct, the external wall 81 of the duct preferably satisfies the following relation (2):

$$R_{ext} = \alpha * R_{ext,comp}, \text{ with } 0 < \alpha < 1 \quad (2)$$

The term $\alpha$ is an acoustic effectiveness factor comprised between 0 and 1 (excluding the limits). Its value varies continuously along the portion P of the duct. It is also adjusted depending on the structure or the design and the performance of the compressor and, if necessary, of the air inlet duct of the turbojet. The closer the value of $\alpha$ is to 1, the more the effectiveness of the invention is reduced, namely in that the noise generated by the compressor is less reduced. The closer the value of $\alpha$ is to 0, the greater the risk of separation of the flow in the supply duct. It is therefore necessary to adjust the value of the term $\alpha$ with precision.

Preferably, at least one radius $R_{ext}$ of the external wall 81 of the duct along the portion P of the duct satisfies the following relation (3):

$$R_{ext} = \alpha * R_{ext,comp}, \text{ with } 0 < \alpha < 0.95 \quad (3)$$

Preferably, a part of the portion P is provided for that comprises a plurality of radii $R_{ext}$, such that the relation (3) is satisfied over the entire length of said part of the portion P.

Moreover, according to current aerodynamic optimization practices, a modification of the structure of the external wall 81 of the duct 80 generally involves consequently modifying the structure of its internal wall.

Thus, when the conduit 80 comprises a portion P as described previously, and that optionally the relation (3) is satisfied, the radius $R_{int}$ of the internal wall 82 of the duct along the portion P is advantageously adjusted as a function of the modification of the radius $R_{ext}$ of the external wall 81 of the duct along said portion P, this in particular so that the cross-section $S = \pi * (R_{ext}^2 - R_{int}^2)$ of the circulation stream of the fluid between the internal wall 82 and the external wall 81 of the duct remains substantially constant along the duct 80.

Preferably, the structure of the internal wall 82 of the duct can be advantageously adjusted so that the radius $R_{int}$ of the internal wall 82 of the duct along the portion P is smaller than the radius $R_{int,comp}$ of the internal wall 82 of the duct at the inlet 84 of the compressor.

The presence of one or more portions P of the duct leads to a modification of the general structure of the duct with respect to the prior art, which results in an alternation of local convergence (or local tightening) of the external wall (respectively of the internal wall) of the duct and a local divergence (or local widening) of the external wall (respectively of the internal wall) of the duct.

Thus, by defining the following quantities indicated in FIG. 2, as a function of their abscissa (position/axial projection) on the axis (x) where:

$x_{Cond}$ represents the abscissa of the duct inlet, coincident here with the end of the separation cone, $x_{comp}$ represents the abscissa of the compressor inlet, $x_{ext\ (min)}$ represents the abscissa of the point of the external wall of the duct for which the radius of the external wall is a minimum, $x_{int\ (min)}$ represents the abscissa of the point of the internal wall of the duct for which the radius of the internal wall is a minimum, a local convergence of the duct is observed, and in particular a local convergence of the external wall between the abscissas $x_{Cond}$ and $x_{ext\ (min)}$ which results in an approach of the external wall to the axis (x) of which the radius $R_{ext}$ changes from $R_{ext,cond}$ to a minimum value $R_{ext\ (min)}$.

Similarly, a local convergence of the internal wall of the duct between the points $x_{Cond}$ and $x_{int\ (min)}$ which results in an approach of the internal wall to the axis (x) of which the radius $R_{int}$ changes from $R_{int,cond}$ to a minimum value $R_{int\ (min)}$.

Downstream of the local convergence of the duct, a local divergence of the duct is observed, in particular a local divergence of the external wall between the points $x_{ext\ (min)}$ and $x_{comp}$ which results in a separation of the external wall from the axis (x) of which the radius $R_{ext}$ changes from $R_{ext\ (min)}$ to $R_{ext,comp}$ at the compressor inlet.

Similarly, a local divergence of the internal wall of the duct between the points $x_{int\ (min)}$ and $x_{comp}$ which results in a separation of the internal wall from the axis (x) of which the radius $R_{int}$ changes from $R_{int\ (min)}$ to $R_{int,comp}$ at the compressor inlet.

It is specified that the minimum values $x_{ext\ (min)}$ and $x_{int\ (min)}$ of the external and internal walls respectively can be equal or different, depending in particular on the performance expected of the turbine engine.

An adjustment of the structure of the internal 82 and external 81 walls of the duct so that their radii $R_{int}$ and $R_{ext}$ along the portion P are less respectively than their radii $R_{int,comp}$ and $R_{ext,comp}$ at the compressor inlet 84 makes it possible to increase the local convergence and the local divergence of the duct. This improves the circulation of the air flow in the duct, and reduces still further the noise generated by the compressor.

Moreover, the risk of flow separation in the duct is conditioned by the variation of the radii of its internal and external walls, in particular downstream of $x_{int\ (min)}$ or $x_{ext\ (min)}$. Having a supply duct of great length allows carrying out a regular, gentle transition of the radii $R_{int}$ and $R_{ext}$ of its internal and external walls, until their respective values $R_{int,comp}$ and $R_{ext,comp}$ at the compressor inlet, which avoids separations of the fluid flow. That is why the supply duct 80 according to the invention is very particularly adapted to turbine engine structures necessitating having a compressor supply duct of great length and more generally to turbine engines having air inlets of great length. An air inlet designates the route used by the air from its entry into the turbine engine 10, via the fan for example, until the compressor inlet 83, this route also including the air inlet duct 50 and the compressor supply duct 80.

Turbine engines with air inlets of great lengths are in particular turbine engines with high bypass ratios. The bypass ratio relates to double flow turbojets and corresponds to the ratio between the secondary flow which bypasses the core of the jet engine and the primary flow which passes through the core of the jet engine. In fact, in order to obtain a high bypass ratio, fans of large dimensions are used. However, due to their large dimensions, their rotation speed is reduced with respect to those of the rotating assemblies of the compressor situated downstream. In order to control the speed of the fan independently of the speed of the rotating assemblies of the compressor, a reduction mechanism (generally called a "gearbox") is generally added, as well as various components at the compressor, which requires an extension of the air inlets, and in particular an extension of the compressor supply duct, so as to obtain a turbine engine structure, the operation whereof is optimal.

The supply duct 80 thus has advantageously a length defined between the abscissa $x_{cond}$ representing the inlet of the duct and the abscissa $x_{comp}$ representing the inlet of the compressor so that the outer radius $R_{ext}$ of the external wall of the duct, the inner radius $R_{int}$ of the internal wall of the duct, said abscissa $x_{cond}$ representing the duct inlet and said abscissa) $x_{comp}$ representing the compressor inlet satisfying the following relation (4):

$$x_{comp} - x_{Cond} > 0.8*(R_{ext} - R_{int}) \tag{4}$$

To conclude, the supply duct according to the invention offers an alternative to the different methods and existing structural adjustments aiming to reduce the noise of a turbine engine, and most particularly the noise generated by the compressor of such a turbine engine.

The invention offers the advantage of being simple to implement, because it involves a local structural change of the duct usually used, not putting into question the general structure of the turbine engine or its mode of operation.

The invention claimed is:

1. A supply duct of a compressor of a turbine engine, the supply duct comprising:
an internal wall and an external wall of revolution around an axis and opposite one another so as to define a circulation stream of a fluid, said stream allowing the fluid to be routed from an inlet of the duct to an inlet of the compressor, a radius of the external wall of the duct at the inlet of the duct being greater than a radius of the external wall of the duct at the inlet of the compressor,
wherein the duct comprises a portion for which the radius of the external wall of the duct along the portion is less than the radius of the external wall of the duct at the inlet of the compressor, and a radius of the internal wall of the duct along the portion of the duct is less than a radius of the internal wall of the duct at the inlet of the compressor, and
wherein an abscissa ($x_{cond}$) on the axis represents the inlet of the duct, an abscissa ($x_{comp}$) on the axis represents the inlet of the compressor, an abscissa ($x_{ext\ (min)}$) on the axis represents a point of the external wall of the duct for which the radius of the external wall is a minimum, and an abscissa ($x_{int\ (min)}$) the axis represents a point of the internal wall of the duct for which the radius of the internal wall is a minimum,
wherein a local convergence of the external wall between the abscissas $x_{cond}$ and $x_{ext\ (min)}$ results in an approach of the external wall to the axis of which the radius of the external wall of the duct changes from the radius of the external wall at the inlet of the duct to the minimum value of the radius of the external wall of the duct, a local convergence of the internal wall of the duct between the abscissas $x_{cond}$ and $X_{int\ (min)}$ results in an approach of the internal wall to the axis of which the radius of the internal wall of the duct changes from the radius of the internal wall of the duct at the inlet of the duct to the minimum value of the radius of the internal wall of the duct,
wherein a local divergence of the external wall between the abscissas $x_{ext\ (min)}$ and $x_{comp}$ results in a separation of the external wall from the axis of which the radius of the external wall of the duct changes from the minimum value of the radius of the external wall of the duct to the radius of the external wall of the duct at the compressor inlet, and a local divergence of the internal wall of the duct between the abscissas $x_{int\ (min)}$ and $x_{comp}$ and results in a separation of the internal wall from the axis of which the radius of the internal wall of the duct changes from the minimum value of the internal wall of the duct to the radius of the internal wall of the duct at the compressor inlet, and
wherein a cross-sectional area of the circulation stream of the fluid between the internal wall and the external wall at the portion of the duct is constant.

2. The duct according to claim 1, wherein at least one radius of the external wall of the duct along the portion of the duct satisfies:

$$R_{ext} = \alpha * R_{ext,comp}, \text{ with } 0 < \alpha < 0.95 \tag{3}$$

where $R_{ext}$ is the at least one radius of the external wall along the portion of the duct, and $R_{ext,comp}$ is the radius of the external wall of the duct at the inlet of the compressor.

3. The duct according to claim 2, wherein the relation (3) is satisfied over an entire length of a part of the portion.

4. The duct according to claim 1, wherein the duct has a length defined between the abscissa ($x_{cond}$) representing the inlet of the duct and the abscissa ($x_{comp}$) representing the inlet of the compressor so that an outer radius ($R_{ext}$) of the external wall of the duct, an inner radius ($R_{int}$) of the internal wall of the duct, said abscissa ($x_{cond}$) representing the inlet of the duct and said abscissa ($x_{comp}$) representing the inlet of the compressor satisfy:

$$x_{Comp} - x_{Cond} > 0.8*(R_{ext} - R_{int}) \tag{4}.$$

5. A turbine engine comprising at least one compressor supplied by at least one supply duct according to claim 1.

6. The turbine engine according to claim 5, said turbine engine being a double flow turbojet.

7. A double flow turbojet comprising at least one compressor supplied by at least one supply duct according to claim 1, the at least one supply duct of the at least one compressor being a circulation duct of a primary flow.

8. The double flow turbojet according to claim 7, wherein the at least one supply duct of the compressor is a supply duct of a low-pressure compressor.

* * * * *